US009854098B2

(12) United States Patent
Mockus et al.

(10) Patent No.: US 9,854,098 B2
(45) Date of Patent: Dec. 26, 2017

(54) ELECTRONIC COMMUNICATION ROUTING BASED DATA ACCURACY

(71) Applicant: Avaya Inc., Santa Clara, CA (US)

(72) Inventors: Audris Mockus, Knoxville, TN (US); Biswajyoti Pal, Navi Mumbai (IN)

(73) Assignee: Avaya Inc., Santa Clara, CA (US)

( * ) Notice: Subject to any disclaimer, the term of this patent is extended or adjusted under 35 U.S.C. 154(b) by 76 days.

(21) Appl. No.: 14/951,038

(22) Filed: Nov. 24, 2015

(65) Prior Publication Data

US 2017/0149969 A1    May 25, 2017

(51) Int. Cl.
| H04M 5/00 | (2006.01) |
| H04M 3/51 | (2006.01) |
| H04L 12/58 | (2006.01) |
| G06F 17/30 | (2006.01) |

(52) U.S. Cl.
CPC .... H04M 3/5183 (2013.01); G06F 17/30654 (2013.01); H04L 51/046 (2013.01); H04L 51/16 (2013.01); H04M 3/5108 (2013.01)

(58) Field of Classification Search
CPC ................... H04M 3/5183; G06F 17/2765
USPC ....... 379/265.01–265.14, 266.01, 266.1, 309
See application file for complete search history.

(56) References Cited

U.S. PATENT DOCUMENTS

| 7,003,091 B1* | 2/2006 | Burns ................... H04M 7/006 379/211.04 |
| 7,023,979 B1 | 4/2006 | Wu et al. |
| 7,644,057 B2 | 1/2010 | Nelken et al. |
| 8,631,153 B2* | 1/2014 | Murthy ................ G06Q 10/107 709/224 |
| 8,666,055 B2 | 3/2014 | Busayapongchai |
| 9,172,809 B1 | 10/2015 | Mockus et al. |
| 2009/0154690 A1* | 6/2009 | Wu ........................ G10L 15/34 379/386 |
| 2012/0179836 A1* | 7/2012 | Murthy ................ G06Q 10/107 709/238 |
| 2014/0136264 A1* | 5/2014 | Kinsey, II ........ G06Q 10/06311 705/7.19 |
| 2014/0164257 A1* | 6/2014 | Brown ................. G06Q 30/016 705/304 |
| 2015/0095080 A1* | 4/2015 | Gatti ..................... G06Q 10/06 705/7.14 |

(Continued)

*Primary Examiner* — William Deane, Jr.
(74) *Attorney, Agent, or Firm* — Sheridan Ross P.C.

(57) ABSTRACT

An electronic communication is received from a first communication device by a multi-tasking operating system. For example, a customer has entered a service request at a web site, which is received by the multi-tasking operating system. The electronic communication comprises a plurality of items of information associated with a service request. An accuracy level for the plurality of items of information is determined. The accuracy level for the plurality of items is based on a history of prior electronic communications. In response to determining the accuracy level for the plurality of items of information associated with the service request, a communication system associated with a contact center and/or a contact center agent is identified. In response to identifying the communication system associated with the contact center and/or contact center agent, the electronic communication is routed to the communication system associated with the contact center and/or contact center agent.

20 Claims, 6 Drawing Sheets

(56) References Cited

U.S. PATENT DOCUMENTS

| | | | |
|---|---|---|---|
| 2016/0111092 A1* | 4/2016 | Odinak | G10L 15/193 704/257 |
| 2016/0227038 A1* | 8/2016 | Odinak | H04W 4/12 |
| 2016/0350674 A1* | 12/2016 | Midboe | G06N 99/005 |
| 2017/0047070 A1* | 2/2017 | Odinak | G10L 15/193 |

* cited by examiner

ELECTRONIC COMMUNICATION ROUTING BASED DATA ACCURACY

TECHNICAL FIELD

The systems and methods disclosed herein relate to communication systems and in particular to routing electronic communications in a contact center.

BACKGROUND

Customers can reach out to contact centers, especially those dealing with technical product support, to initiate a service request. The service request can be generated via a variety of electronic communication mediums, such as via a voice communication, via a video communication, via an Instant Messaging session, an email, via a web server, via Interactive Voice Response (IVR) system, and/or the like. The service request is an electronic communication asking for resolution of a problem related to a product sold to a customer. As the service request is initiated, a variety of data is collected as an input from the customer through the various electronic communication mediums, such as information about the customer, a type of issue, a type of product, a problem severity, and/or the like.

The collected data is required for the service request to be properly routed, managed, and/or reported before, during, and after its resolution. The accuracy of the data is important for timely and effective resolution of service requests. If the data is inaccurate, service requests may be routed to an incorrect communication system or agent. This can lead to decreased customer satisfaction and inefficient usage of contact center resources.

BRIEF SUMMARY

Systems and methods are provided to provide more accurate collected data.

An electronic communication can be received from a first communication device by a multi-tasking operating system. For example, a customer has entered a service request at a web site, which is then received by the multi-tasking operating system. The electronic communication comprises a plurality of items of information associated with a service request. For example, the items of information may include fields to classify the service request and a problem description.

An accuracy level for the plurality of items of information associated with the service request can be determined. The accuracy level for the plurality of items is based on a history of prior electronic communications. In response to determining the accuracy level for the plurality of items of information associated with the service request, a communication system associated with a contact center and/or a contact center agent is identified.

In response to identifying the communication system associated with the contact center and/or contact center agent, the electronic communication can be routed to the communication system associated with the contact center and/or contact center agent.

DETAILED DESCRIPTION

Figure 1:
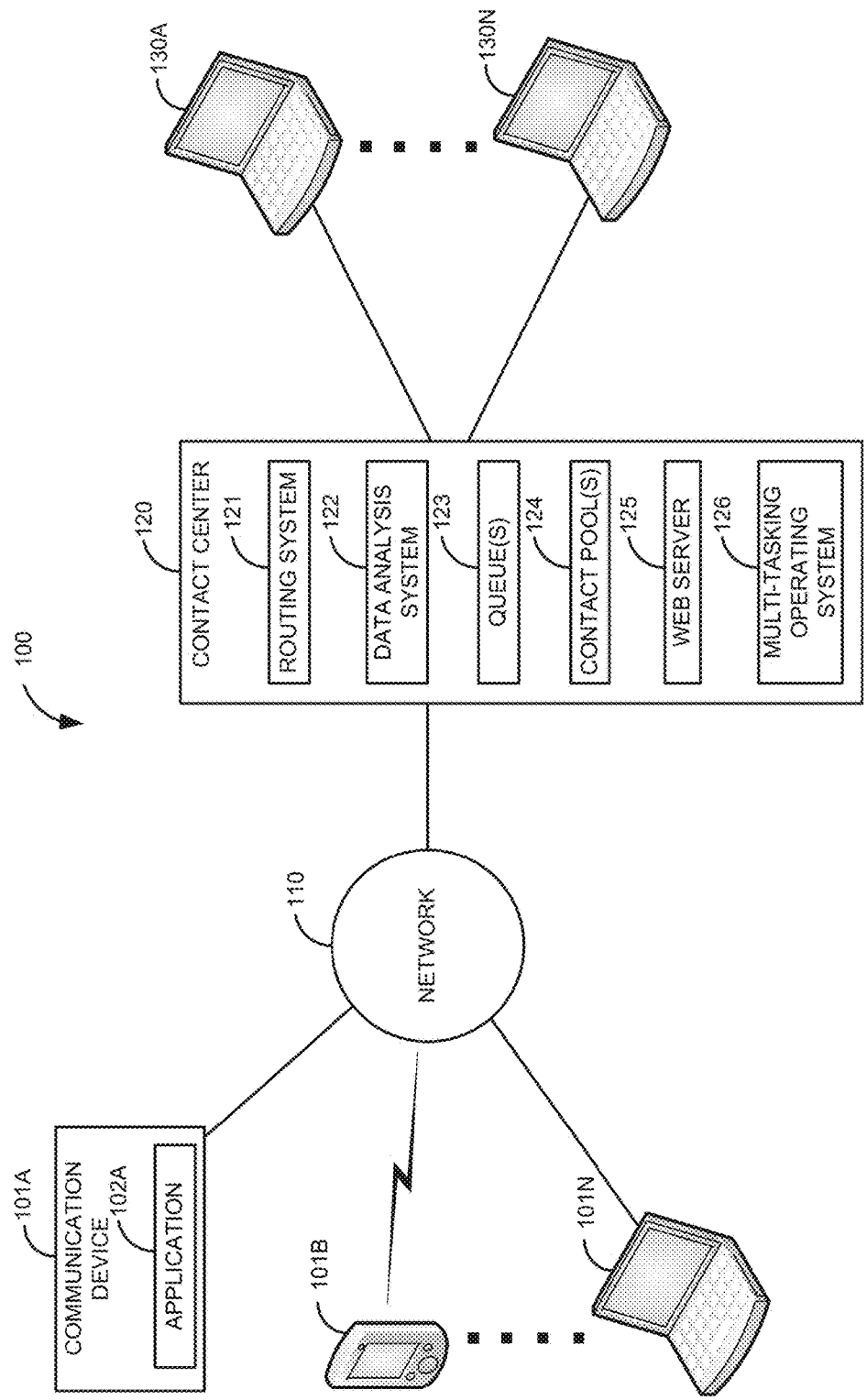
FIG. 1 is a block diagram of a first illustrative system for routing electronic communications in a contact center.

FIG. 1 is a block diagram of a first illustrative system 100 for routing electronic communications in a contact center 120. The first illustrative system 100 comprises communication devices 101A-101N, a network 110, a contact center 120, and agent terminals 130A-130N.

The communication devices 101A-101N can be or may include any hardware device that can communicate on the network 110, such as a Personal Computer (PC), a telephone, a video system, a cellular telephone, a Personal Digital Assistant (PDA), a tablet device, a notebook device, a smart phone, and the like. As shown in FIG. 1, any number of communication devices 101A-101N may be connected to the network 110, including only a single communication device 101. In addition, the communication device 101 may be directly connected to the contact center 120.

The communication device 101A further comprises an application 102A. The application 102A may be a contact center application 102A that allows a user of the communication device 101A to enter a service request and/or establish an electronic communication with the contact center 120. Although not shown for simplicity, the application 102 may also be included in the communication devices 101B-101N.

The network 110 can be or may include any collection of communication equipment that can send and receive electronic communications, such as the Internet, a Wide Area Network (WAN), a Local Area Network (LAN), a Voice over IP Network (VoIP), the Public Switched Telephone Network (PSTN), a packet switched network, a circuit switched network, a cellular network, a combination of these, and the like. The network 110 can use a variety of electronic protocols, such as Ethernet, Internet Protocol (IP), Session Initiation Protocol (SIP), Integrated Services Digital Network (ISDN), email protocols, Instant Messaging (IM) protocols, web server protocols, text messaging protocols, and/or the like. Thus, the network 110 is an electronic communication network configured to carry messages via packets and/or circuit switched communications.

The contact center 120 can be any contact center 120 that can manage electronic communications for customer support, such as a call center. The contact center 120 can send and receive various electronic communications, such as, voice communications, video communications, IM communications, web communications, text communications, and/or the like. The electronic communications may be a service request or may include information associated with a service request. The contact center 120 manages electronic communications between users (e.g., customers) and contact center agents.

The contact center 120 further comprises a routing system 121, a data analysis system 122, a queue(s) 123, a contact pool(s) 124, a web server 125, and a multi-tasking operating system 126. The routing system 121 can be any hardware coupled with software that can route electronic communications from the communication devices 101 to communication system. A communication system can be any system that can receive electronic communications, such as, the queue 123, the contact pool(s) 124, another contact center 120, an agent terminal 130, and/or the like. The routing system 121 can route a variety of electronic communications, such as voice calls, video calls, Instant Messaging (IM), text communications, email communications, virtual reality communications, service requests, and/or the like.

The data analysis system 122 can be or may include any software/hardware that can process information associated with an electronic communication. The data analysis system 122 can process the information associated with an electronic communication in a variety of ways.

The queue(s) 123 can be or may include any software and a memory storage that can be used to hold electronic communications for processing by contact center agents at the agent terminals 130A-130N. For example, the queue(s) 123 may be a linked list of electronic communications stored in a memory of the contact center 120. The electronic communications in the queue(s) 123 may include voice communications, video communications, email communications, text communications, Instant Messaging (IM) communications, and/or the like. The linked list of electronic communications in the queue(s) 123 may also include a service request. The service request comprises information submitted by a customer or contact center agent to address a problem that the customer is having. For example, the customer may be having a problem with a new product recently purchased by the customer. As new electronic communications are received at the contact center 120, the link list in the queue 123 can be dynamically changed by changing pointers in the linked list to point to new electronic communications (e.g., emails, voice calls, etc) that have been received. As the electronic communications are processed, the linked list of electronic communications in the queue 123 can be changed to remove the processed electronic communications from the linked list in the queue 123.

The contact pool(s) 124 are where the contact center 120 operates without queues 123. When the electronic communications are received by the 120, the electronic communications are held in the contact pool(s) 124 until the electronic communications are serviced by a contact center agent. For example, a contact center agent may select a particular electronic communication to service from the contact pool (s) 124. The contact center 120 may be designed to use queue(s) 123 and/or contact pools 124 simultaneously. Alternatively, the contact center 120 may implement only one of the queue(s) 123 or the contact pool(s) 124.

The web server 125 can be or may include any hardware that runs a web server 125. The web server 125 provides web server pages to browsers running in the communication devices 101A-101N. A customer may use the web server 125 to provide a service request to the contact center 120 and initiate an electronic communication to the contact center 120. For example, a customer can go to a web page provided by the web server 125 to enter information for a service request. The customer can then click on a link to have the service request sent to the contact center 120.

The multi-tasking operating system 126 is a specialized operating system for handling electronic communications concurrently. To handle electronic communications concurrently, the multi-tasking operating system 126 supports the ability to provide multiple concurrent threads or daemons. In addition, the multi-tasking operating system 126 can support multiple virtual machines or multiple processor cores to handle large numbers of electronic communications concurrently. For example, as each of the electronic communications are received, a separate thread is created (on a processor core) to handle the electronic communication. The multi-tasking operating system 126 may employ hardware interrupts that call interrupt service routines for handling real-time electronic communications. Thus the multi-tasking operating system 126 may be handling a large number of electronic communications at the same time as separate threads or processes. A multi-tasking operating system 126 is necessary because non-multi-tasking operating systems (e.g., a generic computer) would be unable to handle the electronic communications in a timely manner (e.g., for real-time communications, such as live voice or video communications) when a large number of calls are received at the same time.

The multi-tasking operating system 126 can use a separate thread for the data analysis system 122. For example, when an electronic communication is received by the routing system 121, a separate thread can be spun off to process the data in the electronic communication (e.g., in a service request) for differences. The threads can have different priorities. For example, the thread that receives the electronic communication may have a higher priority than the thread the processes the data in the service request.

The agent terminals 130A-130N can be any hardware device that can receive and/or send electronic communications, such as the communication device 101. The agent terminals 130A-130N may comprise multiple communication devices 101 (e.g., a telephone and a PC) that a contact center agent may use to handle an electronic communication.

Figure 2:
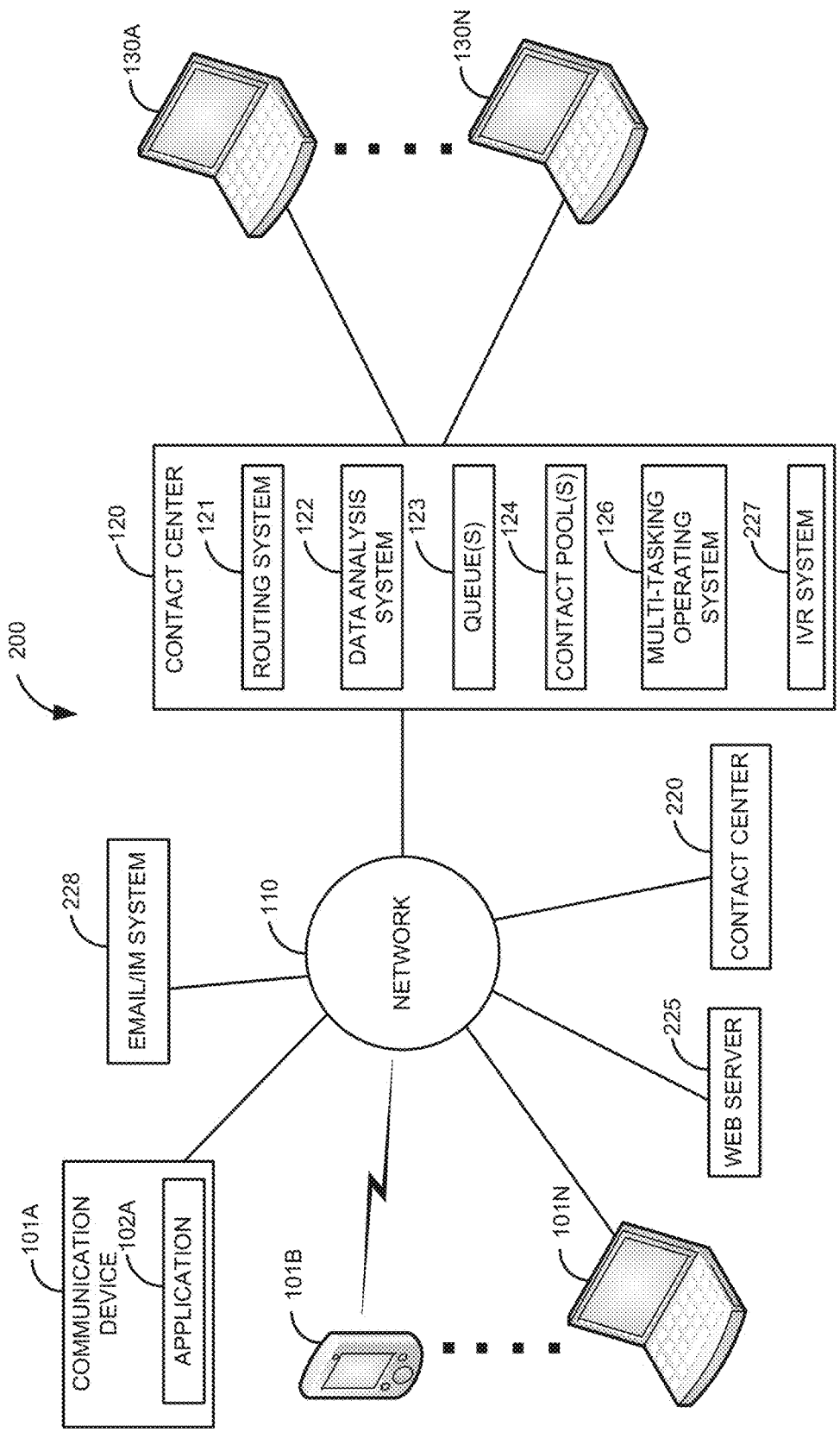
FIG. 2 is a block diagram of a second illustrative system for routing electronic communications in a contact center.

FIG. 2 is a block diagram of a second illustrative system 200 for routing electronic communications in a contact center 120. The second illustrative system 200 comprises the communication devices 101A-101N, the network 110, the contact center 120, the agent terminals 130A-130N, a contact center 220, a web server 225, and an email/Instant Messaging (IM) system 228.

The contact center 120 comprises the routing system 121, the data analysis system 122, the queue(s) 123, the contact pool(s) 124, the multi-tasking operating system 126, and an Interactive Voice Response (IVR) system 227. The IVR system 227 can be any hardware coupled with software that can process voice interaction with a user. For example, a customer may call the contact center 120 and be connected to the IVR system 227. The IVR system 227 may be used to gather information for a service request. The IVR system 227 may utilized by the multi-tasking operating system 126 to handle multiple incoming voice calls concurrently. The IVR system 227 is a specialized voice processing application that can take input, such as Dual Tone Multi-Frequency (DTMF) tones and voice signals to create a service request. The IVR system 227 uses digital signaling processing techniques (e.g., using a specialized digital signaling processor) to process the DTMF tones and voice signals.

The contact center 220 may be a second contact center 220 that electronic communications may be routed to by the routing system 121. For example, the contact center 220 may be at a different location than the contact center 120.

The web server 225 is a web server 225 that is separate from the contact center 120. For example, the web server 225 may be a separate web server 225 that is used by a customer to enter information for a service request and to make an electronic communication with the contact center 120.

The email/IM system 228 can be any hardware coupled with software that can manage email and/or IM communications received at the contact center 120/220. The email/IM system 228 may comprise a queue 123 that is used to queue emails/IMs for the contact center 120.

Figure 3:
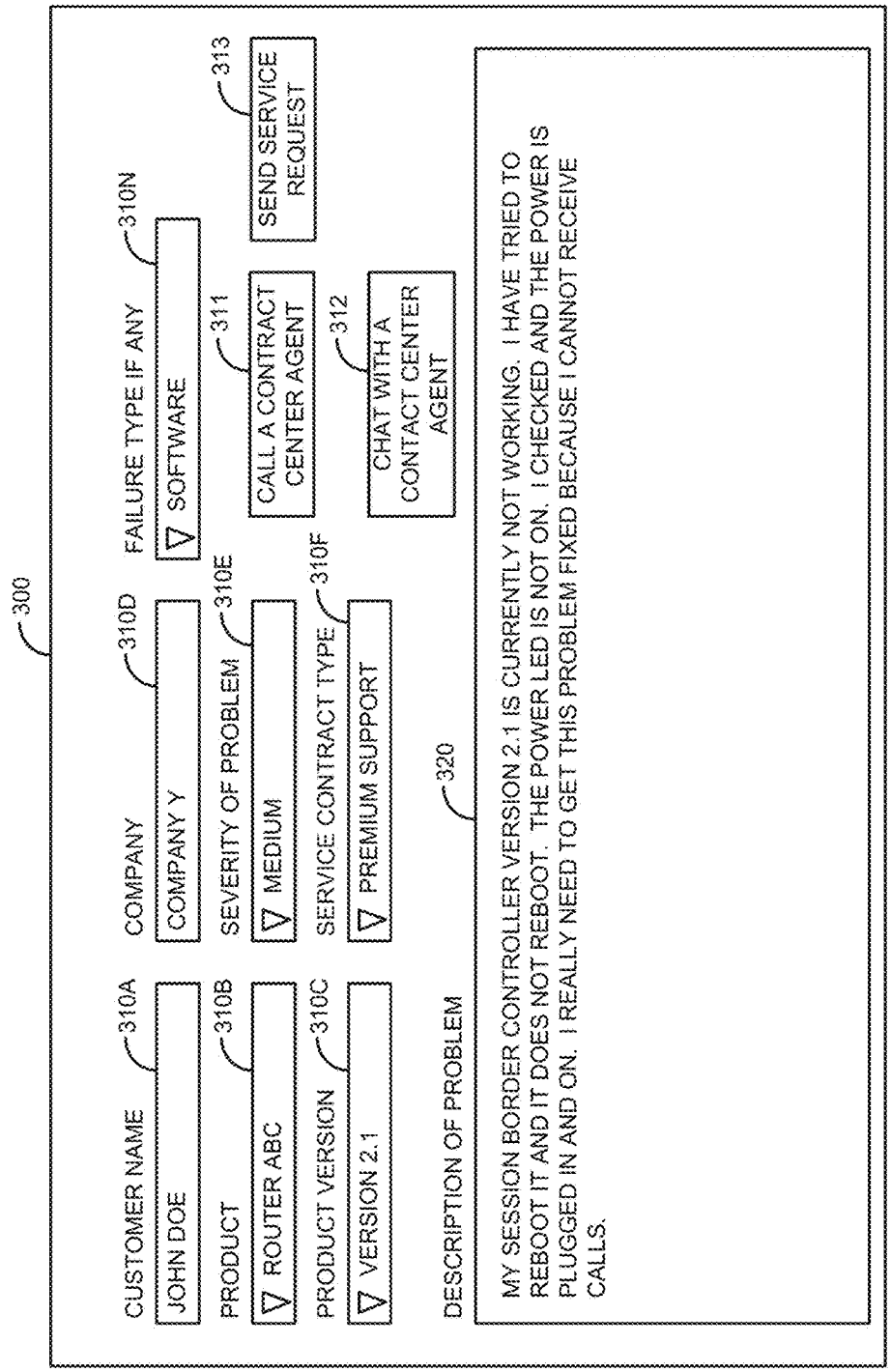
FIG. 3 is a diagram of a user interface for initiating a service request from a web server or user application.

FIG. 3 is a diagram of a user interface for initiating a service request (an electronic communication) from a web server 125/225 or application 102. FIG. 3 comprises a service request window 300. The service request window 300 comprises classification fields 310A-310N, a call contact center agent button 311, a chat with contact center agent button 312, a send service request button 313, and a problem description 320. The service request window 300 may be a web server page that the user access via the web server 125/225. Alternatively, the service request window 300 may be created by the application 102 and displayed to a user on the communication device 101. For example, the application 102 may be a contact center agent application 102 that is downloaded onto a smart phone.

The classification field 310A is a field where the customer can enter a customer name. The classification field 310B is a field where the customer selects a product. The classification field 310C is where the customer selects a product version. The classification field 310D is where the customer enters or selects a company name. The classification field 310E is where the customer selects a severity of the problem. The classification field 310F is where the customer selects the customer's type of support contract. The classification field 310N is where the customer selects the failure type. Although not shown, other types and/or different types of classification fields 310 may be used, such as a date field, a time field, a product skill field, and/or the like. The classification fields 310 can be considered numerical or labeled parameters based on the nature of the field.

The problem description 320 is a field where the customer enters a detailed description of the problem. The problem description field 320 may be any size that is necessary for the customer to properly convey details of the problem. In addition to the problem description field 320, other natural language fields may be included. For example, the service request window 300 may include related web chats, agent notes, and/or the like.

FIG. 3 is an exemplary example of where a customer enters service request information via a text based user interface. However, in other embodiments, the customer may provide one or more of the classification fields 310A-310N and/or the problem description 320 via the IVR system 227. Alternatively, the customer may provide one or more of the classification fields 310 via an IM session or email. In one embedment, the user may provide information for the classification fields 310/problem description 320 to a contact center agent who then enters the information for the classification fields 310/problem description 320 on behalf of the customer. In one embodiment, the classification fields 310/problem description 320 may be provided via multiple methods, such as via the IVR system 227 and the application 102.

Once the customer has entered the necessary information in the classification fields 310A-310N and the problem description 320, the customer may click on the call contact center agent button 311 or the chat with contact center agent button 312 to initiate an electronic communication to the contact center 120.

Alternatively, the customer may select the send service request button 313 to send an electronic communication (a service request) to the contact center 120. In this case, the customer may receive a response communication from contact center 120 (e.g., a contact center agent may call the customer).

Figure 4:
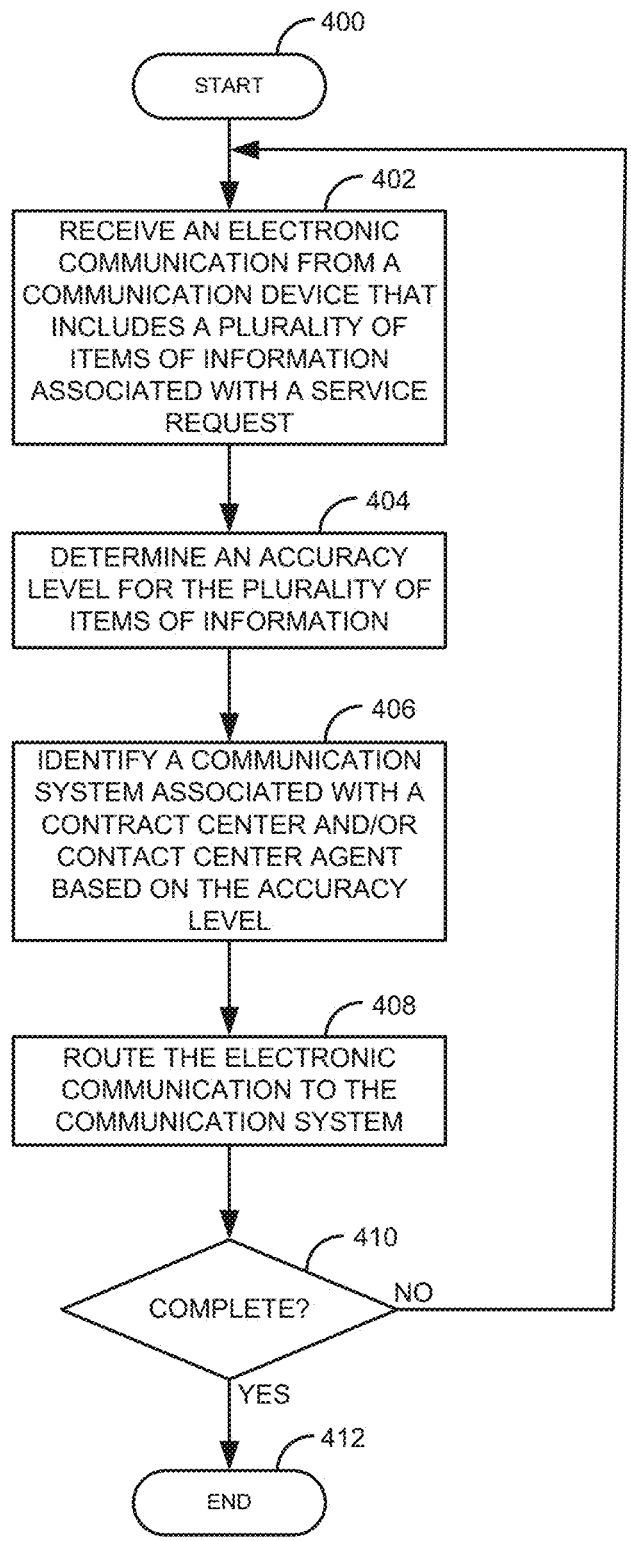
FIG. 4 is a flow diagram of a process for routing electronic communications based on the accuracy of information in a service request.
Figure 5:
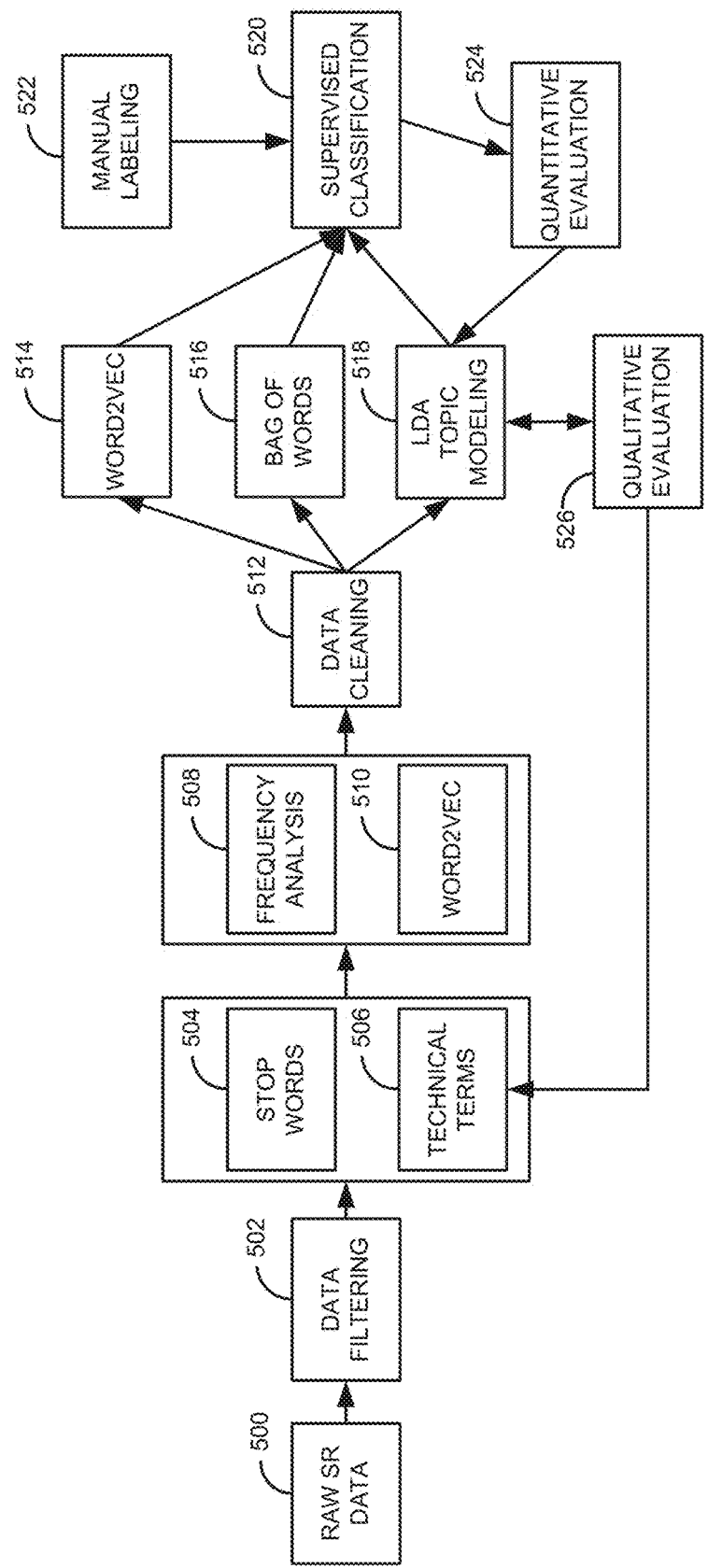
FIG. 5 is a flow diagram of a process for determining an accuracy level for routing electronic communications.
Figure 6:
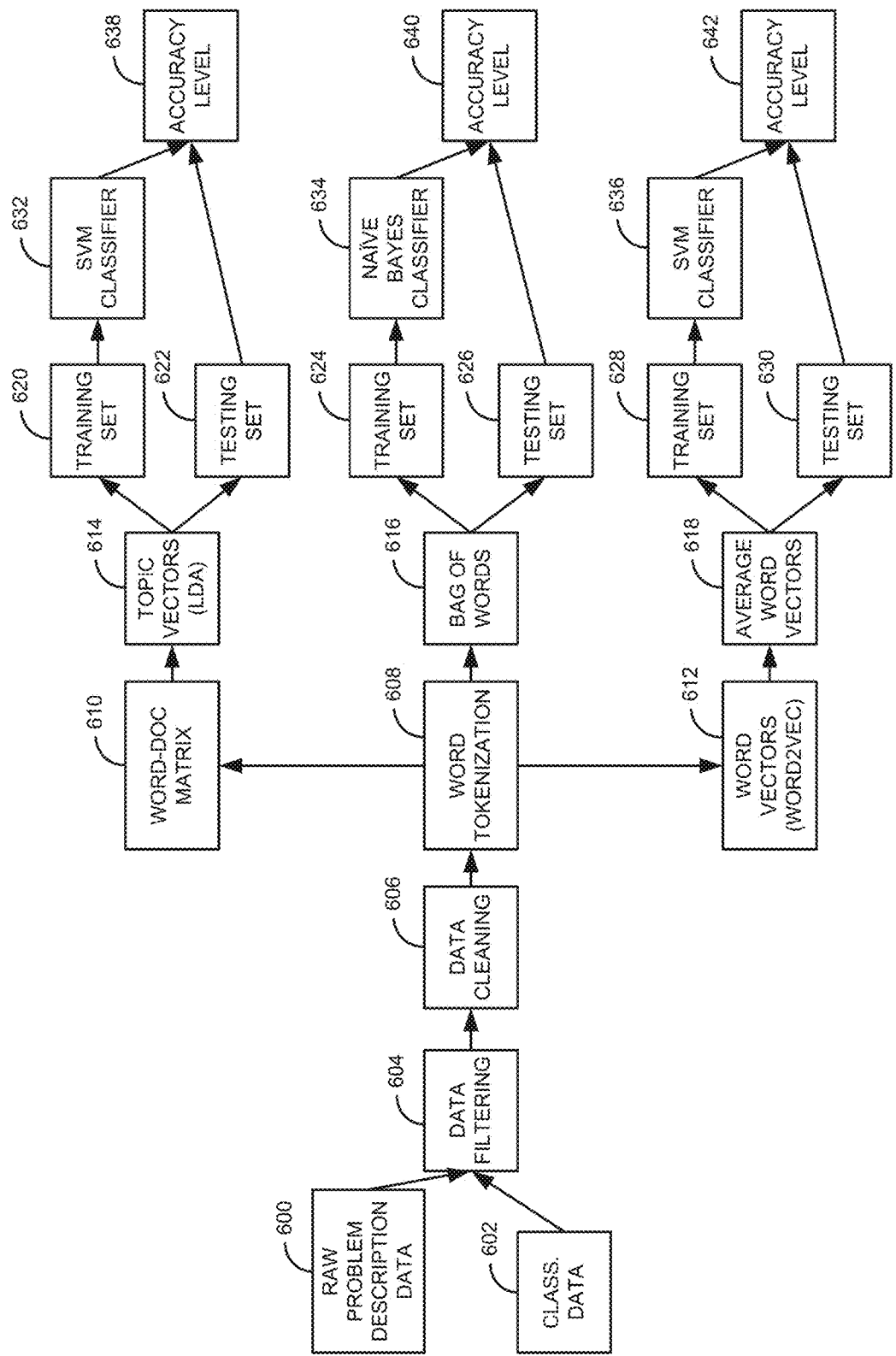
FIG. 6 is a flow diagram of a process for determining an accuracy level for routing electronic communications based on a history of prior electronic communications.

FIG. 4 is a flow diagram of a process for routing electronic communications based on the accuracy of information in a service request. The process of FIG. 4 is based on the information in the classification fields 310A-301N and the problem description 320. Illustratively, the communication devices 101A-101N, the application 102A, the contact centers 120/220, the routing system 121, the data analysis system 122, the queue(s) 123, the contact pool(s) 124, the web servers 125/225, the multi-tasking operating system 126, the email/IM system 228, and the agent terminals 130A-130N are stored-program-controlled entities, such as a computer or processor, which performs the method of FIGS. 4-6 and the processes described herein by executing program instructions stored in a computer readable storage medium, such as a memory or disk. Although the methods described in FIGS. 4-6 are shown in a specific order, one of skill in the art would recognize that the steps in FIGS. 4-6 may be implemented in different orders and/or be implemented in a multi-threaded environment. Moreover, various steps may be omitted or added based on implementation.

The process starts in step 400. An electronic communication is received, by the routing system 121, from a communication device 101 in step 402. The electronic communication includes some or all of the classification fields 310A-310N and the product description 320. For example, the customer enters the classifications fields 310A-310N and product description 320 (via the application 102A or via the web server 125/225) and the selects one of the buttons 311-313 to initiate the electronic communication received in step 402.

The data analysis system 122 determines an accuracy level for the classification fields 310A-310N and the product description 320 (the plurality of items) in step 404. The accuracy level is based on a history of prior electronic communication.

The data analysis system 122 identifies a communication system associated with the contact center 120/220 and/or a contact center agent (e.g., an agent terminal 130) based on the accuracy level in step 406. The routing system 121 routes the electronic communication to the communication system associated with the contact center 120/220 and/or the contact center agent in step 408. For example, the routing system 121 may route the electronic communication to a specific person or group, such as a specific product escalation group. The process determines if the process is complete in step 410. If the process is not complete in step 410, the process goes back to step 402 to receive another electronic communication. Otherwise, if the process is complete in step 410, the process ends in step 412.

To illustrate, consider the following example. The contact center 120 has different levels of support for the session border controller version 2.1. The contact center 120 has a similar tier structure for the router ABC. In addition, the contact center 120 has an agent group that handles misclassified service requests. The three levels of support include tier 1, tier 2, and tier 3. Tier 1 handles basic problems, such as configuration and simple issues. Tier 2 handles more complex problems, such as difficult configuration issues. Tier 3 handles severe problems (e.g., the system is not working at all) that cannot be handled without expertise on session border controller version 21. Tier 3 may bring in product development to identify software/hardware bugs.

The history of prior electronic communications that were resolved by each of the tier systems (for both router ABC and session border controller version 2.1) are classified via a clustering algorithm (e.g., as further described in FIGS. 5 and 6) to identify the terms in the product description 320 that typically match an electronic communication (service request, call, etc.) that is handled by a specific tier. The routing system 121 receives (step 402) a voice communication when the customer selects the call the contact center agent button 311 after filling out the classification fields 310A-310N and the problem description 320 as shown in FIG. 3.

The data analysis system 122 determines an accuracy of classification fields 310 and the problem description 320 compared to the history of electronic communications in step 404. For example, one or more thresholds may be defined for the accuracy level (e.g., 80% likelihood that this is the correct tier). Since the product selected was router ABC, the comparison with the history of prior electronic communications is based on the three tiers for router ABC. Since the problem description 320 does not match the product (in classification field 310B) and the severity in classification field 310E does not match the problem description 320, the accuracy is determined to be low (e.g., 10%).

The data analysis system 122 identifies a communication system associated with the contact center 120/220 and/or a contact center agent (agent terminal 130) in step 406. If there are discrepancies between the classification fields 310 and the problem description 320, the data analysis system 122 will likely determine a different communication system to route the electronic communication to. For example, in FIG. 3, the customer has selected the product to be router ABC in the classification field 310B. The problem description 320 identifies that the session border controller version 2.1 is not working. In addition, the customer has selected the severity as being medium. The description indicates that the problem is severe because the customer cannot receive any calls. Previously, this service request would have been routed to a tier 2 contact center agent that handles router ABC. The call would have then been rerouted to tier 3 for the session border controller version 2.1 after the contact center agent determines that the customer entered mismatching information.

However, since there are two discrepancies, the accuracy level is deemed to only be 10%. The data analysis system 122 identifies that the voice call should be routed to the agent group that handles misclassified service requests in step 406 and the routing system 121 routes the call to the agent group that handles misclassified service requests in step 408. A message can also be sent to the contact center agent that handles the service request. For example, the message may be displayed in the agent terminal 130 that indicates the problem description 320 says that the problem is in router ABC while the description describes the session border controller version 2.1. Similarly, the message may identify that the customer said that the severity was listed as medium, even though the description indicated a severe problem.

Alternatively, the data analysis system 122 may route the call to the IVR system 227 in step 406. The voice call is routed to the IVR system 227 in step 408. The discrepancies are pointed out to the customer by the IVR system 227. The customer can then resolve the discrepancies so that the call is eventually routed to an agent who supports tier 3 for the session border controller 2.1.

In one embodiment, the data analysis system 122 routes the call directly to the tier 3 agent for the session border controller version 2.1 based on previous electronic communication having the similar discrepancies. A message can also be sent to the agent that indicates the discrepancies between the classification fields 310 and the description.

The above example describes where the electronic communication (service request) is routed to a contact center agent (via agent terminal 130) or the IVR system 227. In other embodiments, the communication system that the electronic communication is routed to may be the queue 123, the contact pool 126, the contact center 220, the web server 225, a different web page, the email/IM system 228, and/or the like.

In other embodiments, the threshold may include multiple thresholds. For example, if accuracy level is above 80% the call is routed to a first agent or first group, if the accuracy level is 50% and 80%, the call is routed a second agent or second group, and if the call is below 50%, the call is routed a third agent or third group.

In one embodiment, the communication to an expert that can review to the service request to resolve the discrepancies between the classification fields 310 and the problem description 320. The expert may be determined based on based on the agent's past behavior, such as which products the agent serviced, agent productivity, prior quality of service, and/or the like.

FIG. 5 is a flow diagram of a process for determining an accuracy level for routing electronic communications. The raw service request data (the classification fields 310A-310N and the problem description 320) 500 are filtered in step 502. Step 502 filters any service requests that do not have a problem description 320 (e.g., a natural language problem description 320 in English). This removes any service requests that do not fit the model being used to classify service requests. Step 502 may be used to remove duplicate service requests. The data filtering of step 502 may be specific to a product release and/or version.

The raw service request data 500 is then filtered to remove any stop words in step 504. Stop words are the word tokens to be removed from the problem description 320. The stop words are a list of words (or phrases) that are the most common un-informative words in the English language, typically pronouns and prepositions. For example, "everything," "want," and "acquire" are examples of stop words. In addition, frequently occurring words in the context of the contact center 120/220 are filtered. For example "call," and "problem" are filtered in step 504.

Specific technical terms are filtered in step 506. Technical terms are word tokens to be considered for further analysis that are normalized to a set of dictionary tokens. These tokens are technology specific to customer support and domain specific terms for the products being supported. For example, "music on hold" (product feature), "busy signal" (system output), "voice mail pro" (product add on), Product X (separate product), and/or the like. The need for normalization arises because the same term may have different representations within various groups with the company and customer service units. In addition, semantically similar phrases like "non-functional" and "not working" are placed under the same token. The contexts in which these terms occur are also taken into consideration. For example, terms like "drop," "forward," and "transfer" in isolation are treated differently than when it occurs with the word "call" in cases like "call drop," "call forward," and "call transfer," which are product features.

In addition, acronyms for technical terms can also be filtered. For example, the term "MOI," which stands for "music on hold" can be used to filter out the term MOI.

In addition, generic terms are used to classify words. Generic terms are derivational and inflectional forms of words that are reduced to a basic root from using an appropriate stemmer. The stemmer can be based on the Paice/Husk Lancaster stemmer as it is a heavy stemmer with a better Error Rate Relative to Truncation (ERRT). Using a Paice/Husk Lancaster stemmer helps in reducing the dimensionality of the bag of words representation of the problem descriptions 320. For example, the terms "licenses," "licensed," "license," "licensing" are reduced to "license." Similarly, acronyms for terms can also be in stemming words.

For the remaining terms, a frequency of the terms across all problem descriptions 320 is calculated in step 508. If the mean and variance of the frequency is less than a fixed threshold, the term is considered a stop word. Smaller value of mean would indicate the term is important for few problem descriptions 320, removing them reduces dimensionality and chances of over fitting with minimal loss of information. Smaller value of variance would indicate more uniform occurrence of the term across all problem descriptions 320. Some examples of generic terms relabeled as stop words after frequency analysis are "back," "make," "done," and "know."

For all stop words removed earlier, a word2vec similarity is calculated for the term across all problem descriptions 320, and eventually terms similar to the stop word, before stemming. Word2vec is an algorithm that takes a text corpus and produces word vectors as a word output. These terms may be considered as stop words after manual evaluation. For example, for "back," "another." "changed," and "someone" may be changed to stop words. The technique is also applied for technical words before stemming. For example, for "oneX" (product series), "Communicator" (related product), "Outlook" (related feature), "Web" (related product), "Mobile" (related product), "Assistant" (related product), and "Portal" (related product). The technique is applied for stop words and technical terms after stemming as well. For example, this enables detection of stop words like "also" and "try" from "make" and technical terms like "PSTN," "analog," "alarm," "PRI," from "SIP." The data is cleaned in step 512 based on the identified stop words (step 504), the technical terms (step 506), the frequency analysis (step 508), and the word2vec (step 510).

One of the approaches utilized is topic modeling for feature extraction from the problem description 320 via Latent Dirichlet Allocation (LDA) topic modeling as a black box in step 518. Hence, this discussion on LDA is limited but to address issues that are specific to LDA.

Given a set of problem description 320 corpus, D={d1, d2 . . . , dn} and a specific number of topics, and by choosing standard values for hyper-parameters (a and β) required by LDA, we obtain a topic-keyword distribution, τ and a document-topic distribution, ΔL. The topic keyword distribution illustrates that typically a topic is heavily weighted towards a few words. These top words define a topic. The document distribution gives the probability for each topic that a document may belong to. The topic can be used to identify a specific support group in the contact center 120. If the lexical content is low or if the problem description 320 has high noise content there is a good chance that the document distribution will not have a high probability for any topic.

Even though the representation of problem descriptions 320 using LDA as an atomic operation, there are two issues. One is to define the number of topics. This may be done through manual evaluation as explained in the subsequent sections.

When using LDA, a second issue that needs to be resolved is an appropriate transformation for problem description 320 corpus or word-document matrix. The challenge lies in the fact that the problem descriptions 320 are very short in length. Thus, we replace term frequency in TF-IDF with binary weights—TF=1 if the term is present in the document and TF=0 if the term is not present.

Biterm Topic Model (BTM) can also be used as an alternative to LDA. BTM is a word co-occurrence based topic model that learns topics by modeling word-word co-occurrences patterns (e.g., biterms—two words co-occurring in the same context).

In addition to topic modeling of problem descriptions 320, the simple bag-of-words model may be used as one alternative in step 516. However, bag-of-words may lead to increased dimensionality.

The technique Word2Vec, can also be used to derive a feature for subsequent supervised classifications in step 514. Firstly, Word2Vec is used to map each word into its corresponding vector. Secondly, the average of vector of all the word vectors is calculated. Lastly, this average calculated vector is used as input to the classification algorithms. In FIG. 5, only one of the steps 514, 516, and 518 may be used as a processing algorithm. Alternatively, a combination of steps 514, 516, and 518 may be used.

The output of steps 514, 516, and/or 518 is provided to a classification algorithm in step 520. For example based on a Native Bayes classifier that is used for the bag of word of step 516. The classifier is then run on a testing set to predict the independent variable and to compute the accuracy, precision, and recall values. The process is repeated a number of times by using quantitative evaluation 524.

In addition, manual labeling can also be used to enhance the classification in step 522. Manual labeling can be used to identify stop words. Also, a manual qualitative evaluation can be used in step 526 to identify technical terms that may need to be filtered in step 506.

FIG. 6 is a flow diagram of a process for determining an accuracy level for routing electronic communications based on a history of prior electronic communications. The raw problem description 320 data and the classification field 310 data are provided to the data filtering and data cleaning steps 604 and 606. Steps 604 and 606 are similar to steps 502-512. The filtered and cleaned data can be sent to different classification algorithms.

For example, the filtered and cleaned data can be sent to a word tokenization process in step 608 to identify key words in the problem description 320 (e.g., a topic of the problem description 320) along with word-document-matrix classification algorithm in step 610. The word-document-matrix algorithm is a mathematical algorithm that describes the frequency of terms that occur in the problem description 320. Topic vectors are then created for the terms using Latent Dirichlet Association (LDA) algorithm in step 614 for the problem description 320. The process is repeated for a number of product descriptions 320. For example, the product description of 80 service requests is processed using steps 604, 606, 610, and 614. The results of the training set 620 are input to a Support Vector Machine (SVM) classifier to determine an accuracy level in step 638. The process of steps 604, 606, 610, and 614 are also completed for a training set 622. For example the training is for 20 service requests (a 4:1 ratio). The accuracy level from the training set is compared to the accuracy level for the training set to see how accurate the model is in step 638. The accuracy level form step 638 is used to define the accuracy level for routing service requests.

Similarly, after step 608, a bag of words algorithm 616 can be used on a training set 624 (e.g., to 80 problem descriptions 320) along with a Naïve Bayes classifier 634 to determine an accuracy level 640. Likewise, a testing set 626 (e.g., 20 problem descriptions 320) can be used for comparison to generate the accuracy level 640.

Alternatively, a word2vec algorithm 612 that averages word vectors 618 can be used on a training set 628. The results from the training set 628 are feed into an SVM classifier to determine an accuracy level 642. Likewise, a testing set 630 is used by steps 612, 618 as a comparison to the accuracy level determined by the SVM classifier 636 to produce the accuracy level 642.

The topics with the highest relevancy are used as a basis for calculating how likely (e.g., a percentage) a service request will match a likely support group (e.g., routing a service request/communication to a $3^{rd}$ their support group for product X.). For example, if the accuracy level of step 638 is determined to be 80% accurate, the system can predict that a particular service request is likely or not likely to eventually get routed to a particular support group. If the accuracy of a new service request is determined to be lower (e.g., below the mean for step 638), the data analysis system 122 compares the classification fields 310 to see if they match the product description 320. For example, if the product 310B (router ABC)/product version 310C (version 2.1) was used to try and classify a new service request using the product description 320, the level of accuracy would clearly fallow below the mean because the product description is for a session border controller (a different product), where there would be few topic/word matches if any. Therefore, the service request/electronic communication would be routed different group or agent in the contact center 120.

In one embodiment, the accuracy results can be used to improve the system. For example, the system may automatically detect a pattern in the discrepancies between the classification fields 310 and the problem description 320. For example, customers are continually selecting the wrong product in classification field 310B, the system may automatically change a description associated with the product field. Alternatively, a selection can be changed or added in a classification field 310.

The new service request can later be added to the training set 620/624/628 or the testing set 622/626/630. This can help improve the accuracy level.

Of course, various changes and modifications to the illustrative embodiment described above will be apparent to those skilled in the art. These changes and modifications can be made without departing from the spirit and the scope of the system and method and without diminishing its attendant advantages. The following claims specify the scope of the disclosure. Those skilled in the art will appreciate that the features described above can be combined in various ways to form multiple variations of the disclosure. As a result, the disclosure is not limited to the specific embodiments described above, but only by the following claims and their equivalents.

The phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

The term "module" as used herein refers to any known or later developed hardware, software, firmware, artificial intelligence, fuzzy logic, or combination of hardware and software that is capable of performing the functionality associated with that element. Also, while the disclosure is described in terms of exemplary embodiments, it should be appreciated that individual aspects of the disclosure can be separately claimed. As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

What is claimed is:

1. A system for routing electronic communications comprising:
a microprocessor,
a memory, coupled with the microprocessor;

a routing system executed by the microprocessor that receives an electronic communication from a first communication device, wherein the electronic communication comprises a plurality of separate items of information associated with a service request entered by a user in a user input window, wherein the plurality of separate items comprise a separate problem description and one or more separate classification fields, and, in response to identifying a communication system associated with a contact center and/or a contact center agent, route the electronic communication to the communication system, wherein routing the electronic communication to the communication system is based on an accuracy level for the plurality of separate items of information; and a data analysis system executed by the processor that determines the accuracy level for the plurality of separate items of information associated with the service request based on one or more discrepancies between the problem description and the one or more classification fields and based on a history of prior electronic communications, and, in response to determining the accuracy level for the plurality of separate items of information associated with the service request, identifies the communication system.

2. The system of claim 1, further comprising determining a plurality of thresholds and wherein the plurality of thresholds are used to determine three or more different communication systems associated with the contact center and/or contact center agent.

3. The system of claim 1, wherein the routing system sends a message to the contact center agent that identifies the one or more discrepancies between the problem description and the one or more classification fields.

4. The system of claim 1, wherein the data analysis system detects a pattern in the one or more discrepancies; and does one of the following in response to detecting the pattern:
  changes a description of at least one of the one or more classification fields in the user input window of the plurality of separate items of information;
  changes a selection in the at least one of the one or more classification fields in the user input window; or
  adds an additional classification field in the user input window.

5. The system of claim 1, wherein the data analysis system receives a list of stop words or phrases specific to a product or service associated with the service request; and filters the problem description based on the list of stop words.

6. The system of claim 1, wherein the accuracy level based on the history of prior electronic communications is determined based on a training set of prior electronic communications and a test set of prior electronic communications for a specific group of contact center agents.

7. The system of claim 6, wherein the electronic communication is added to the training set or the test set to more accurately determine the accuracy level.

8. The system of claim 1, wherein the accuracy level for the plurality of separate items of information associated with the service request is determined based on a specific technical term associated with a product or service.

9. The system of claim 8, wherein the specific technical term associated with the service request also has an acronym for the specific technical term and wherein the technical term and the acronym for the specific term are used by an algorithm to determine the accuracy level for the plurality of items associated with the service request.

10. A method for routing electronic communications comprising:
  receiving, by a processor, an electronic communication from a first communication device, wherein the electronic communication comprises a plurality of separate items of information associated with a service request entered by a user in a user input window and wherein the plurality of separate items comprise a separate problem description and one or more separate classification fields;
  determining, by the processor, an accuracy level for the plurality of separate items of information associated with the service request is based on one or more discrepancies between the problem description and the one or more classification fields and a history of prior electronic communications;
  in response to determining the accuracy level for the plurality of separate items of information associated with the service request, identifying, by the processor, a communication system associated with a contact center and/or a contact center agent; and
  in response to identifying the communication system associated with the contact center and/or contact center agent, routing, by the processor, the electronic communication to the communication system.

11. The method of claim 10, wherein the accuracy level is a threshold that comprises a plurality of thresholds and wherein the plurality of thresholds are used to determine three or more different communication systems associated with the contact center and/or contact center agent.

12. The method of claim 10, further comprising: sending a message to the contact center agent that identifies the one or more discrepancies between the problem description and the one or more classification fields.

13. The method of claim 10, further comprising:
  detecting a pattern in the one or more discrepancies; and
  in response to detecting the pattern doing one of the following:
    changing a description of at least one of the one or more classification fields in the user input window;
    changing a selection in the at least one of the one or more classification fields in the user input window; or
    adding an additional classification field in the user input window.

14. The method of claim 10, further comprising:
  receiving a list of stop words or phrases specific to a product or service associated with the service request; and
  filtering the problem description based on the list of stop words.

15. The method of claim 10, wherein the accuracy level based on the history of prior electronic communications is determined based on a training set of prior electronic communications and a test set of prior electronic communications for a specific group of contact center agents.

16. The method of claim 15, wherein the electronic communication is added to the training set or the test set to more accurately determine the accuracy level.

17. The method of claim 10, wherein the accuracy level for the plurality of separate items of information associated with the service request is determined based on a specific technical term associated with a product or service.

18. The method of claim 10, wherein the one or more discrepancies between the problem description and the one or more classification fields comprises a discrepancy between the description and a product classification field.

19. The method of claim 10, wherein the communication system is a contact center queue, wherein the contact center queue dynamically changes pointers in a linked list to point to the electronic communication.

20. A method comprising:
receiving, by a processor, an electronic communication from a first communication device, wherein the electronic communication comprises a separate problem description and one or more separate classification fields of a service request entered by a first user in a user input window;
determining, by the processor, an accuracy level for a plurality of separate items of information associated with the service request, wherein the accuracy level for the plurality of items is based on one or more discrepancies between the separate problem description and the one or more separate classification fields;
in response to determining the accuracy level for the plurality of separate items of information associated with the service request, routing, by the processor, the service request to a communication system associated with a contact center and/or a contact center agent;
detecting, by the processor, a pattern in the one or more discrepancies based on a history of prior electronic communications;
in response to detecting the pattern in the one or more discrepancies, modifying the user input window by at least one of:
changing, by the processor, a description of at least one of the one or more separate classification fields in the user input window;
changing, by the processor, a selection in the at least one of the one or more separate classification fields in the user input window; or
adding, by the processor, an additional classification field in the user input window; and
sending for display, by the processor, the modified user input window to a second user.

* * * * *